(12) United States Patent
Washburn

(10) Patent No.: US 9,097,172 B2
(45) Date of Patent: Aug. 4, 2015

(54) SWITCHABLE WATER PUMP CONTROL SYSTEMS AND METHODS

(75) Inventor: George T. Washburn, Royal Oak, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1157 days.

(21) Appl. No.: 12/553,327

(22) Filed: Sep. 3, 2009

(65) Prior Publication Data

US 2011/0048390 A1 Mar. 3, 2011

(51) Int. Cl.
  F01P 7/00 (2006.01)
  B60H 1/02 (2006.01)
  F01P 7/16 (2006.01)

(52) U.S. Cl.
  CPC ............. F01P 7/162 (2013.01); F01P 2025/00 (2013.01); F01P 2025/13 (2013.01); F01P 2025/62 (2013.01); F01P 2025/66 (2013.01); F01P 2037/02 (2013.01); F01P 2060/08 (2013.01); F01P 2060/16 (2013.01)

(58) Field of Classification Search
  CPC ...... F02N 2200/0811; F01P 7/00; B60H 1/02
  USPC .......... 123/568.21, 41.02; 417/14; 237/12.3 A
  See application file for complete search history.

(56) References Cited

U.S. PATENT DOCUMENTS

| | | | |
|---|---|---|---|
| 3,855,975 A * | 12/1974 | Masaki et al. | 123/41.13 |
| 4,079,715 A * | 3/1978 | Masaki et al. | 123/41.05 |
| 4,526,257 A | 7/1985 | Mueller | |
| 4,621,594 A | 11/1986 | Kubis | |
| 4,967,567 A * | 11/1990 | Proctor et al. | 62/127 |
| 6,886,649 B2 * | 5/2005 | Wakashiro et al. | 180/65.26 |
| 7,269,963 B2 * | 9/2007 | Yonekura et al. | 62/133 |
| 7,322,183 B2 * | 1/2008 | Sisken et al. | 60/295 |
| 7,409,929 B2 * | 8/2008 | Miyahara et al. | 123/41.05 |
| 8,430,071 B2 | 4/2013 | Carlson et al. | |
| 2004/0182097 A1 | 9/2004 | La Falce et al. | |
| 2007/0022979 A1 | 2/2007 | Gradu et al. | |
| 2008/0003938 A1 * | 1/2008 | Baruschke et al. | 454/143 |
| 2008/0217083 A1 | 9/2008 | Serkh et al. | |
| 2009/0229543 A1 * | 9/2009 | Suzuki | 123/41.02 |
| 2010/0051711 A1 * | 3/2010 | Cavanaugh | 237/12.3 A |
| 2011/0005474 A1 * | 1/2011 | Carlson et al. | 123/41.1 |
| 2011/0146945 A1 * | 6/2011 | Morita et al. | 165/51 |

FOREIGN PATENT DOCUMENTS

| | | |
|---|---|---|
| CN | 101233338 A | 7/2008 |
| DE | 10037823 A1 | 2/2002 |
| DE | 10143109 A1 | 3/2003 |
| DE | 102005003881 A1 | 7/2006 |
| WO | WO 2007007775 A1 * | 1/2007 |

* cited by examiner

*Primary Examiner* — Mahmoud Gimie
*Assistant Examiner* — David Hamaoui

(57) ABSTRACT

An engine control system for a vehicle comprises a pump control module and a heating request determination module. The pump control module disengages a switchable water pump from an engine upon startup of the engine. The heating request determination module generates a heat request signal that indicates whether heating of a passenger cabin of the vehicle has been requested based on ambient air temperature, humidity of ambient air, and a status of an air conditioner clutch. The pump control module selectively engages the switchable water pump after the heat request signal is generated.

18 Claims, 5 Drawing Sheets

SWITCHABLE WATER PUMP CONTROL SYSTEMS AND METHODS

FIELD

The present disclosure relates to internal combustion engines and more particularly to switchable water pumps.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

SUMMARY

An engine control system for a vehicle comprises a pump control module and a heating request determination module. The pump control module disengages a switchable water pump from an engine upon startup of the engine. The heating request determination module infers whether heating of a passenger cabin of the vehicle has been requested based on ambient air temperature and at least one of humidity of ambient air and a status of an air conditioner clutch and generates a heat request signal indicative of the inference. The pump control module selectively engages the switchable water pump after the heat request signal is generated.

In other features, when the heating request determination module infers that heating of the passenger cabin has been requested, the pump control module engages the switchable water pump when a difference between a coolant temperature and the ambient air temperature is greater than a predetermined temperature difference.

In still other features, the heating request determination module infers that heating of the passenger cabin has been requested when the ambient air temperature is less than a predetermined temperature.

In further features, the heating request determination module infers that heating of the passenger cabin has been requested when the ambient air temperature is greater than a predetermined temperature and the humidity is greater than a predetermined humidity.

In still further features, the heating request determination module infers that heating of the passenger cabin has been requested when the air conditioner clutch is engaged.

In other features, the pump control module engages the switchable water pump when at least one of an engine speed is greater than a predetermined engine speed, a vehicle speed is greater than a predetermined vehicle speed, and an engine load is greater than a predetermined engine load.

In still other features, the pump control module engages the switchable water pump when a period that the switchable water pump has been disengaged after the startup is greater than a predetermined period.

In further features, the pump control module engages the switchable water pump when a metal temperature is greater than a predetermined temperature.

In still further features, the engine control system further comprises a thermostat diagnostic module. The thermostat diagnostic module selectively requests engagement of the switchable water pump after the startup and that selectively diagnoses faults in a thermostat while the switchable water pump is engaged. The pump control module engages the switchable water pump when requested by the thermostat diagnostic module.

In other features, the engine control system further comprises an exhaust gas recirculation (EGR) cooling module. The EGR cooling module selectively requests engagement of the switchable water pump after the startup to cool exhaust gas provided to the engine. The pump control module engages the switchable water pump when requested by the EGR cooling module.

An engine control method for a vehicle, comprises: disengaging a switchable water pump from an engine upon startup of the engine; inferring whether heating of a passenger cabin of the vehicle has been requested based on ambient air temperature, humidity of ambient air, and a status of an air conditioner clutch; generating a heat request signal indicative of a result of the inferring; and selectively engaging the switchable water pump after the heat request signal is generated.

In other features, the engine control method further comprises, when the result of the inferring is that heating of the passenger cabin has been requested, engaging the switchable water pump when a difference between a coolant temperature and the ambient air temperature is greater than a predetermined temperature difference.

In still other features, the engine control method further comprises inferring that heating of the passenger cabin has been requested when the ambient air temperature is less than a predetermined temperature.

In further features, the engine control method further comprises inferring that heating of the passenger cabin has been requested when the ambient air temperature is greater than a predetermined temperature and the humidity is greater than a predetermined humidity.

In still further features, the engine control method further comprises inferring indicating that heating of the passenger cabin has been requested when the air conditioner clutch is engaged.

In other features, the engine control method further comprises engaging the switchable water pump when at least one of an engine speed is greater than a predetermined engine speed, a vehicle speed is greater than a predetermined vehicle speed, and an engine load is greater than a predetermined engine load.

In still other features, the engine control method further comprises engaging the switchable water pump when a period that the switchable water pump has been disengaged after the startup is greater than a predetermined period.

In further features, the engine control method further comprises engaging the switchable water pump when a metal temperature is greater than a predetermined temperature.

In still further features, the engine control method further comprises selectively requesting engagement of the switchable water pump after the startup to diagnose faults in a thermostat while the switchable water pump is engaged and engaging the switchable water pump when requested.

In other features, the engine control method further comprises selectively requesting engagement of the switchable water pump after the startup to cool exhaust gas provided to the engine and engaging the switchable water pump when requested.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

Figure 1A:
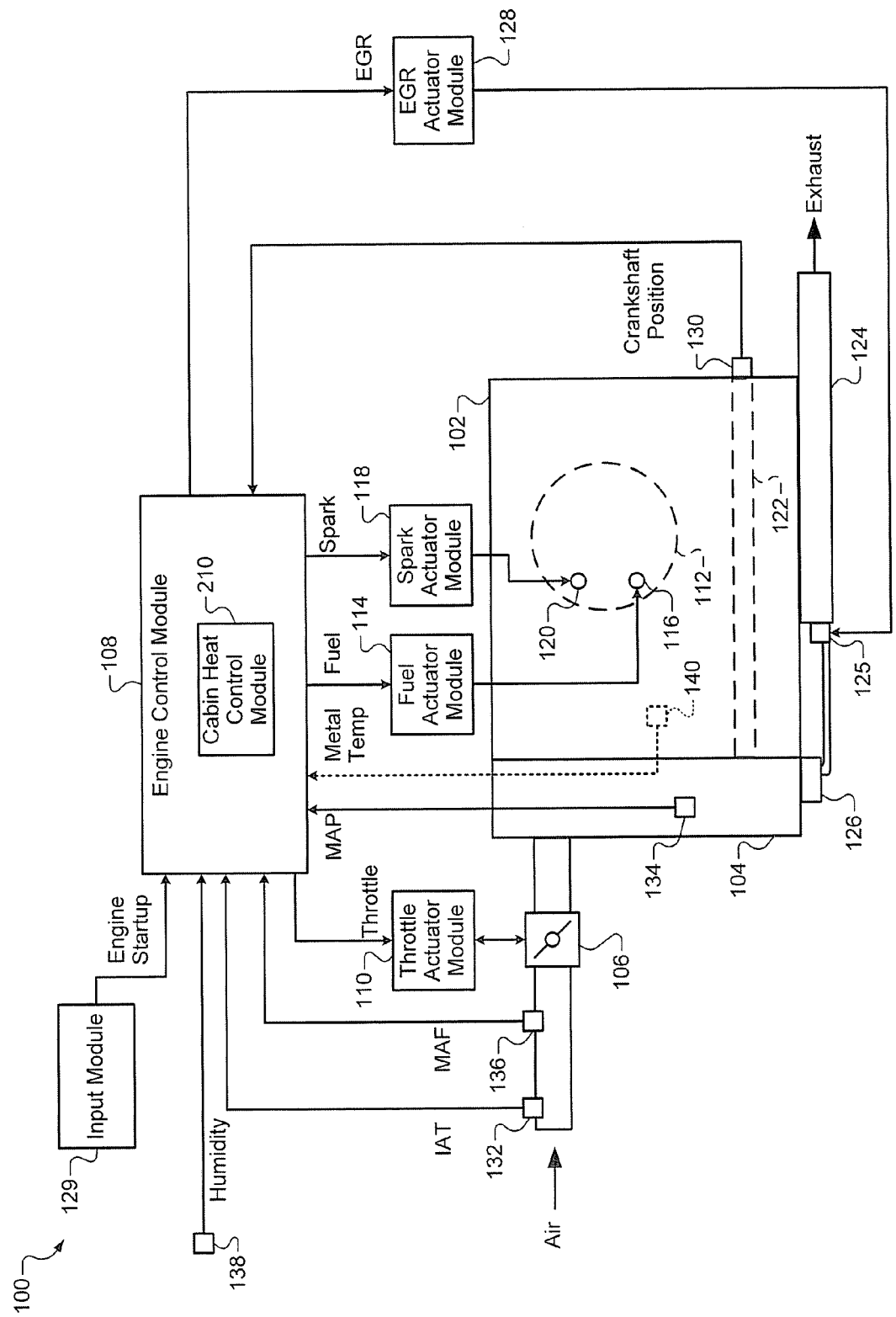
FIGS. 1A-1B are functional block diagrams of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Engine coolant absorbs heat produced by an engine. When engaged, a switchable water pump circulates the engine coolant throughout an engine system for various heating and cooling purposes. For example only, the switchable water pump pumps warm coolant from the engine to a radiator for engine cooling. The switchable water pump also pumps warm coolant from the engine to a heater core to warm a passenger cabin of a vehicle.

An engine control module (ECM) disengages a switchable water pump from the engine after the engine is started. Disengaging the switchable water pump ensures that engine coolant that is warmed by the engine is retained within the engine, which increases engine efficiency. The ECM determines (e.g., infers) whether passenger cabin heating has likely been requested and selectively engages the switchable water pump after the determination.

The ECM determines whether passenger cabin heating has likely been requested based on ambient air temperature, humidity of the ambient air, and a status of an air conditioning system. Determining whether cabin heating has likely been requested based on these inputs provides a reliable indication of whether passenger cabin heating has likely been requested. Making this determination based on these inputs, which are already available to the ECM, eliminates the need to incorporate a new module or device for making the determination that would need to comply with on board diagnostic (OBD) requirements.

Figure 1B:
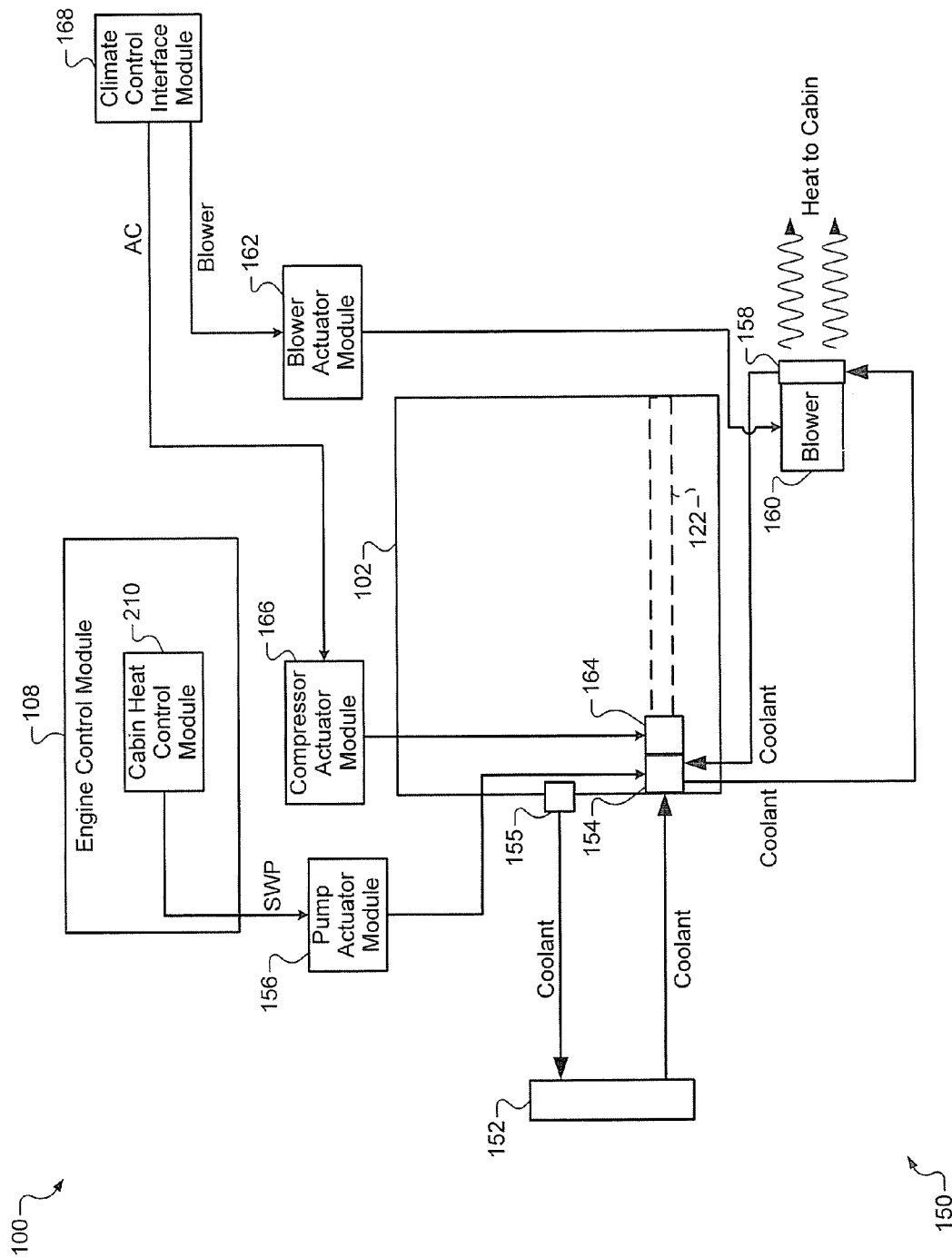

Referring now to FIGS. 1A-1B, functional block diagrams of an exemplary engine system 100 are presented. The engine system 100 includes an engine 102 that combusts an air/fuel mixture to produce drive torque for a vehicle. Air is drawn into an intake manifold 104 through a throttle valve 106. For example only, the throttle valve 106 may include a butterfly valve having a rotatable blade. While a spark ignition, gasoline-type engine will be described herein, the present disclosure is applicable to other types of torque producers, such as ethanol and methanol combusting engines, diesel-type engines, fuel cell engines, propane engines, and hybrid-type engines implementing one or more electric motors.

An engine control module (ECM) 108 controls a throttle actuator module 110, which regulates opening of the throttle valve 106 to control the amount of air drawn into the intake manifold 104. Air from the intake manifold 104 is drawn into cylinders of the engine 102. While the engine 102 may include multiple cylinders, for illustration purposes a single representative cylinder 112 is shown. For example only, the engine 102 may include 2, 3, 4, 5, 6, 8, 10, and/or 12 cylinders.

The ECM 108 controls a fuel actuator module 114, which regulates fuel injected by a fuel injector 116. For example, the amount of fuel injected may be regulated to achieve a desired air/fuel ratio. Fuel may be injected into the intake manifold 104 at a central location or at multiple locations, such as near an intake valve (not shown) associated with each of the cylinders. In some implementations, fuel may be injected directly into the cylinders.

The injected fuel mixes with air and creates an air/fuel mixture. A piston (not shown) within the cylinder 112 compresses the air/fuel mixture. Based upon a signal from the ECM 108, a spark actuator module 118 energizes a spark plug 120 in the cylinder 112. The spark ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft 122. Once the piston reaches a bottommost position, referred to as bottom dead center (BDC), the piston begins moving up again to expel the byproducts of combustion from the cylinder 112. The byproducts of combustion are exhausted from the vehicle via an exhaust system 124. The ECM 108 may control the spark actuator module 118 by specifying how far before or after TDC the spark should be provided. Operation of the spark actuator module 118 may therefore be synchronized with rotation of the crankshaft 122.

The engine system 100 may include an exhaust gas recirculation (EGR) valve 125, which selectively redirects exhaust gas back to the intake manifold 104. An EGR cooler 126 may be implemented to cool the exhaust gas before the exhaust gas is input to the intake manifold 104. An EGR actuator 128 controls opening of the EGR valve 125 based on signals from the ECM 108.

Startup commands for the engine 102 are relayed to the ECM 108 by an input module 129. An engine startup command may be generated based on, for example, turning of an ignition key or depression of a button. A starter (not shown) is engaged and the starter drives rotation of the crankshaft 122 when an engine startup command is received.

The ECM 108 may use signals from various sensors to make control decisions for the engine system 100. The engine system 100 may measure the speed of the crankshaft 122 in revolutions per minute (rpm) using a crankshaft sensor 130. The crankshaft sensor 130 measures the position of the crankshaft 122 and outputs a crankshaft position signal accordingly. For example only, the crankshaft sensor 130 may include a variable reluctance (VR) sensor or another suitable type of crankshaft sensor.

The crankshaft position signal may include a pulse train. Each pulse of the pulse train may be generated as a tooth of an N-toothed wheel (not shown) that rotates with the crankshaft, passes the VR sensor. Accordingly, each pulse corresponds to an angular rotation of the crankshaft 122 by an amount equal to 360° divided by N teeth. The N-toothed wheel may also include a gap of one or more missing teeth, and the gap may be used as an indicator of one complete revolution of the crankshaft 122 (i.e., 360° of crankshaft rotation).

The temperature of ambient air being drawn into the engine 102 may be measured using an intake air temperature (IAT) sensor 132. The pressure within the intake manifold 104 may be measured using a manifold absolute pressure (MAP) sensor 134. In some implementations, engine vacuum, which is the difference between ambient air pressure and the pressure within the intake manifold 104, may be measured.

The mass flow rate of air flowing into the intake manifold 104 may be measured using a mass air flow (MAF) sensor 136. In some implementations, the MAF sensor 136 may be located in a housing that also includes the throttle valve 106. Humidity of the ambient air may be measured using a humidity sensor 138. For example only, the humidity sensor 138 may measure relative humidity of the ambient air.

In some implementations, a metal temperature sensor 140 may measure temperature of the engine 102. For example only, the metal temperature sensor 140 may measure temperature of the engine 102 at the cylinder head or cylinder block. In other implementations, the ECM 108 may estimate the metal temperature, as discussed further below. In such implementations, the metal temperature sensor 140 may be omitted.

The ECM 108 may communicate with other vehicle systems to coordinate operation of the engine system 100 with those vehicle systems. For example only, the ECM 108 may communicate with a transmission control module (not shown) regarding gear shifts in a transmission and/or a hybrid control module (not shown) to coordinate operation of the engine 102 and one or more electric motors.

Each system that varies an engine parameter may be referred to as an actuator. The engine parameter varied by each actuator may be referred to as an actuator value. For example, the throttle actuator module 110 may be referred to as an actuator and the throttle opening area may be referred to as the actuator value. In the example of FIG. 1A, the throttle actuator module 110 achieves the throttle opening area by adjusting the angle of the blade of the throttle valve 106. The ECM 108 may control the actuator values to achieve a desired engine torque output.

As shown in FIG. 1B, the engine system 100 also shows a heating and cooling system 150. Engine coolant is circulated throughout the engine system 100 for various heating and cooling purposes. For example only, the warm coolant is circulated away from the engine 102 to cool the engine 102. Warm coolant is also circulated for warming of a passenger cabin of the vehicle.

Coolant circulates through various coolant passages (not shown) within the engine 102. For example only, the engine 102 may include coolant passages through the cylinder head and the cylinder block of the engine 102. Coolant is transferred between the engine 102 and a radiator 152 to transfer heat away from the engine 102. More specifically, the coolant absorbs heat generated by combustion, and the heat is later transferred to air passing the radiator 152.

A water pump, and more particularly a switchable water pump 154, circulates coolant between the engine 102 and the radiator 152 when the switchable water pump 154 is engaged and a thermostat 155 is open. The thermostat 155 is selectively opened to facilitate coolant flow between the engine 102 and the radiator 152. For example only, the thermostat 155 may be opened when the temperature of coolant within the engine 102 exceeds a predetermined opening temperature. While the thermostat 155 is shown as being an outlet-side thermostat, the thermostat 155 may be an inlet-side thermostat.

The switchable water pump 154 is driven by the engine 102, such as by rotation of the crankshaft 122. The switchable water pump 154 includes a clutch or other friction device that is actuated to selectively engage and disengage the switchable water pump 154 from the engine 102. The switchable water pump 154 may be selectively disengaged to, for example, disable the circulation of coolant throughout the engine system 100. A pump actuator module 156 controls actuation of the clutch based on switchable water pump (SWP) signals from the ECM 108.

The switchable water pump 154 also controls circulation of coolant to a radiative heating element 158 (e.g., a heater core). More specifically, the switchable water pump 154 pumps coolant to the radiative heating element 158 when the switchable water pump 154 is engaged. The coolant transfers heat to the radiative heating element 158.

A blower 160 transfers air across the radiative heating element 158 into the passenger cabin of the vehicle. Heat from the coolant is transferred to air, and the air transfers the heat into the passenger cabin, thereby warming the passenger cabin. A blower actuator module 162 controls operation of the blower 160 based on blower signals a climate control interface module 168.

The vehicle may also include an air conditioning system that is used in controlling the temperature of the passenger cabin. The air conditioning system may be operated to, for example, cool the passenger cabin and/or perform defrost. The air conditioning system includes an air conditioner (AC) unit 164 that is, like the switchable water pump 154, driven by the engine 102. The AC unit 164 also includes a clutch or other friction device that allows the AC unit 164 to be selectively disengaged from the engine 102. A compressor actuator module 166 controls the AC clutch based on AC signals from the ECM 108 and/or the climate control interface module 108.

User inputs for use of the air conditioning system are provided to the ECM 108 by the climate control interface module 168. User inputs for heating of the passenger cabin, however, are not provided to the ECM 108 by the climate control interface module 168. Instead, whether passenger cabin heating has likely been requested is inferred as discussed further below. The climate control interface module 168 may include one or more knobs, buttons, and/or other suitable devices through which the user may request adjustments to the temperature of the passenger cabin and defrost.

The ECM 108 of the present disclosure includes a cabin heat control module 210 that disables the switchable water pump 154 after an engine startup command is received. The cabin heat control module 210 maintains the switchable water pump 154 as disabled until an enabling condition is satisfied when it is likely that heating of a passenger cabin has not been requested. When passenger cabin heating has likely been requested, the cabin heat control module 210 maintains the switchable water pump 154 as disabled until a difference between a coolant temperature and the ambient air temperature is greater than a predetermined temperature difference. Maintaining the switchable water pump 154 as disabled retains warm coolant within the engine 102, which increases engine efficiency.

The cabin heat control module 210 determines (e.g., infers) whether passenger cabin heating has likely been requested based on inputs available to the ECM 108, such as the status of the AC unit 164, ambient air temperature, and humidity of the ambient air. For example only, the cabin heat control module 210 determines that passenger cabin heating has been requested when the AC unit 164 is engaged, the ambient air temperature is less than a predetermined temperature, or the ambient air temperature is greater than the predetermined temperature while the humidity is greater than a predetermined humidity. Inferring whether cabin heating has been requested based on the inputs available to the ECM 108 provides a reliable indication of whether passenger cabin heating has likely been requested and eliminates the need a new module or device that would need to comply with on board diagnostic (OBD) requirements.

Figure 2A:
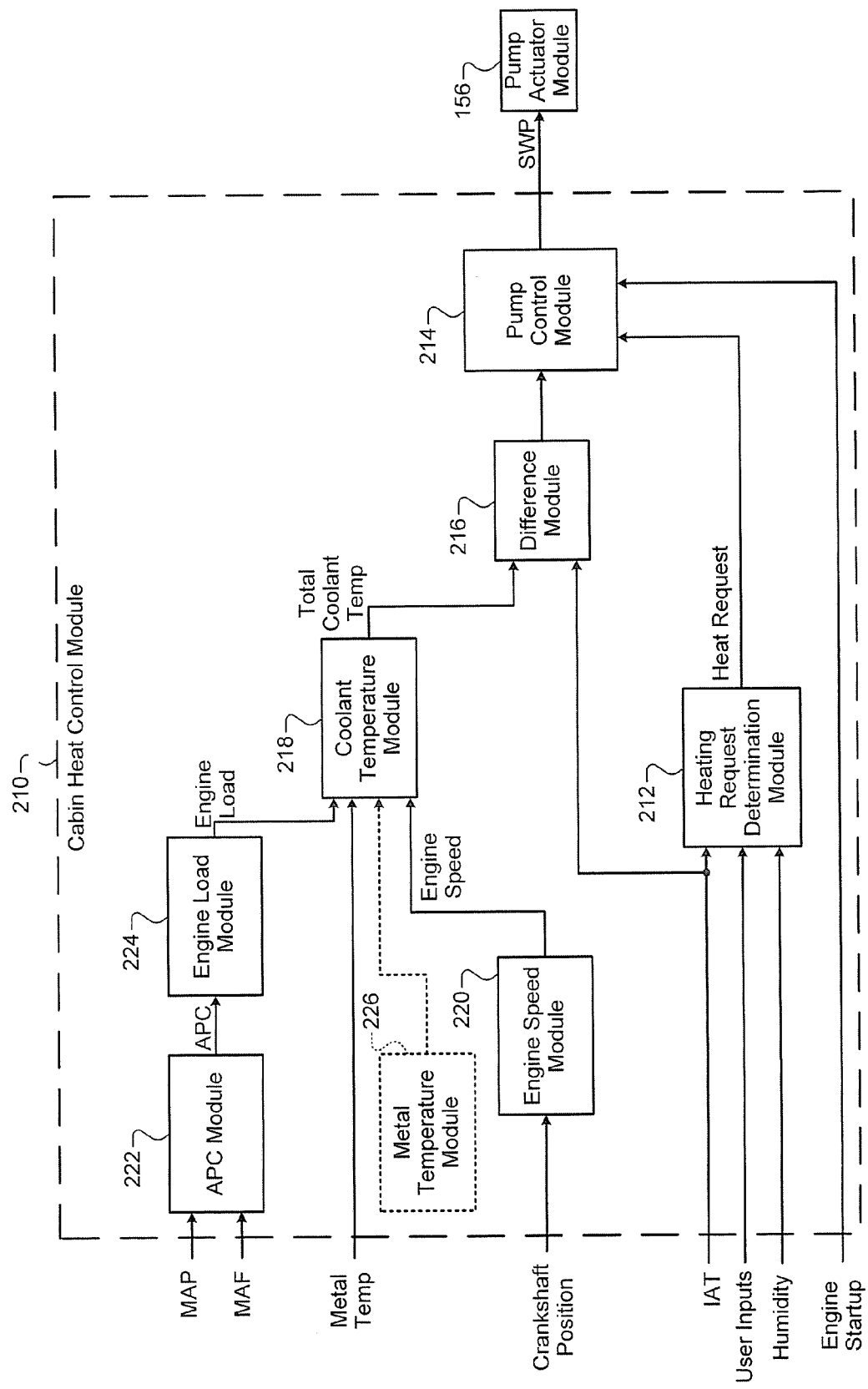
FIGS. 2A-2B are functional block diagrams of an exemplary water pump control module according to the principles of the present disclosure.
Figure 2B:
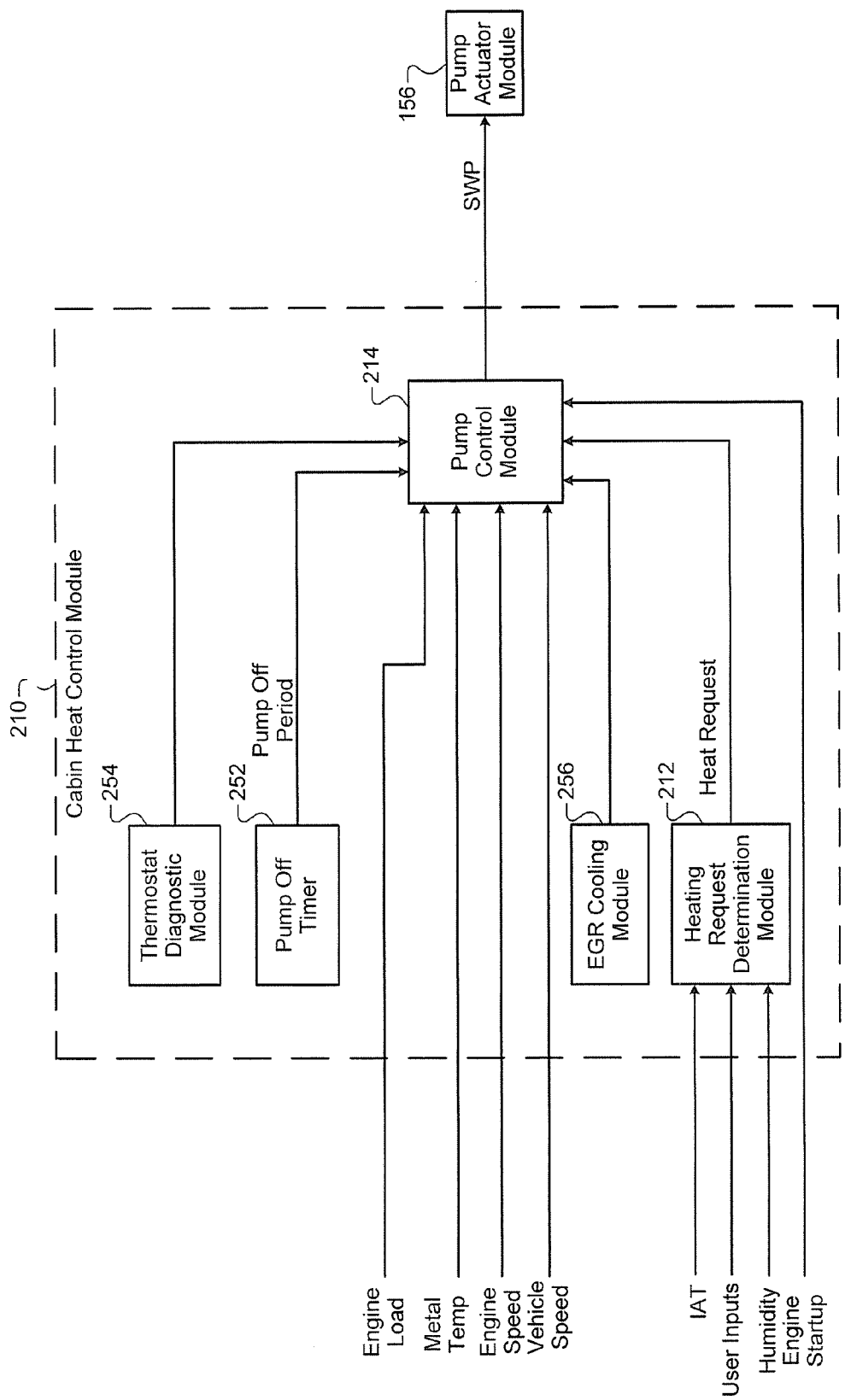

Referring now to FIGS. 2A-2B, functional block diagrams of an exemplary cabin heat control module 210 are presented. The cabin heat control module 210, as shown in FIG. 2A, includes a heating request determination module 212, a pump control module 214, and a difference module 216. The cabin heat control module 210 also includes a coolant temperature module 218, an engine speed module 220, an APC module 222, and an engine load module 224.

The heating request determination module 212 generates a heat request signal that indicates whether heating of the passenger cabin of the vehicle has likely been requested. The heating request determination module 212 determines whether heating of the passenger cabin has been requested based on whether the AC unit 164 is engaged or disengaged from the engine 102, the ambient air temperature, and the humidity of the ambient air.

The heating request determination module 212 indicates that heating of the passenger cabin has been requested when the AC unit 164 is engaged. For example only, the heating request determination module 212 may determine whether the AC unit 164 is engaged based on whether the AC clutch is engaged.

The heating request determination module 212 also indicates that heating of the passenger cabin has been requested when the ambient air temperature is less than a predetermined temperature. The predetermined temperature may be calibratable and may be set to, for example, approximately 15.0° C.

The heating request determination module 212 also indicates that heating of the passenger cabin has been requested when the ambient air temperature is greater than the predetermined temperature and the humidity is greater than a predetermined humidity. The predetermined humidity may be calibratable and may be set to, for example, approximately 50.0% relative humidity.

Upon receiving the engine startup command, the pump control module 214 disengages the switchable water pump 154. The pump control module 214 receives the heating request signal and selectively engages the switchable water pump 154 after the heating of the passenger cabin has been requested. The pump control module 214 also selectively engages the switchable water pump 154 when heating of the passenger cabin has not been requested as discussed below with respect to FIG. 2B. Enabling the switchable water pump 154 circulates warm coolant throughout the engine system 100, such as to the radiative heating element 158. Activation of the blower 160 thereafter warms the passenger cabin.

The pump control module 214 maintains the switchable water pump 154 as disengaged from the engine 102, however, even after heating of the passenger cabin has been requested. More specifically, the pump control module 214 maintains the switchable water pump 154 as disengaged until a temperature difference between the temperature of the coolant throughout the engine system 100 and the ambient air temperature is greater than a predetermined temperature difference.

Maintaining the switchable water pump 154 as disengaged until the temperature difference is greater than the predetermined temperature difference ensures that passenger cabin warming is not attempted until warming will likely be experienced by a passenger. Warming attempted when the temperature difference is less than the predetermined temperature difference may be perceived by a passenger as cooling rather than warming. The predetermined temperature difference may be calibratable and may be set to, for example, approximately 15.0° C.

The difference module 216 determines the temperature difference based on the difference between the temperature of the coolant throughout the engine system 100 and the ambient air temperature. The temperature of the coolant throughout the engine system 100 will be referred to as total coolant temperature. The total coolant temperature corresponds to an estimate of the coolant temperature that will be present once the coolant has been mixed and reached a uniform temperature throughout the engine system 100. In other words, the total coolant temperature corresponds to an estimate of the coolant temperature that will be present after the coolant in the coolant passages of the engine 102, the radiative heating element 158, the EGR cooler 126, and the connecting lines has reached a uniform temperature.

The coolant temperature module 218 estimates the total coolant temperature based on engine speed, the metal temperature, and engine load while the switchable water pump 154 is disengaged. For example only, the total coolant temperature may increase as the engine speed, the metal temperature, and/or the engine load increase.

The engine speed module 220 determines the rotational speed of the engine 102 (i.e., the engine speed) in revolutions per minute (rpm). In one implementation, the engine speed module 220 determines the engine speed based on the crankshaft position provided by the crankshaft sensor 130. For example only, the engine speed module 220 may determine the engine speed based on the period of time between the pulses of the pulse train output by the crankshaft sensor 130.

In some implementations, the metal temperature may be provided by the metal temperature sensor 140. In other implementations, the metal temperature may be determined based on various inputs. In such implementations, the cabin heat control module 210 may include a metal temperature module 226 that determines the metal temperature. For example only, the metal temperature module 226 may determine the metal temperature using the equation:

$$\text{EngineTemp} = A^*ES + B^*APC + C^*APC^2 + D^*VS + E^*CT + F^*IAT,$$

where ES is the engine speed, APC is air per cylinder or engine load, VS is the vehicle speed, CT is temperature of the coolant measured by a coolant temperature sensor (not shown), and IAT is the intake air temperature. A, B, C, D, E, and F are predetermined coefficients.

The engine load module 224 determines the engine load and provides the engine load to the coolant temperature module 218. In some implementations, the engine load module 224 determines the engine load based on the volume of air per cylinder (APC) combusted within the engine 102. The APC module 222 may determine the APC based on, for example, the MAF and/or MAP. The APC may be expressed as a cumulative average of the APC within each cylinder since the engine startup.

Referring to FIG. 2B, the pump control module 214 also selectively engages the switchable water pump 154 when passenger cabin heating has not been requested. The heating request determination module 212 may indicate that heating of the passenger cabin has not been requested when the ambient air temperature is greater than the predetermined temperature and the humidity is less than the predetermined humidity. In some implementations, the heating request determination module 212 may indicate that heating of the passenger cabin has not been requested when the AC unit 164 is disengaged from the engine 102 and the ambient air temperature is greater than the predetermined temperature.

When passenger cabin heating has not been requested, the pump control module 214 selectively engages the switchable water pump 154 when one or more enabling criteria have been satisfied. A first enabling criteria may be satisfied when the engine load is greater than a predetermined engine load. The engine load may be provided by, for example, the engine load module 224. The predetermined engine load may be calibratable and may be set to, for example, approximately 50% of a maximum engine load of the engine 102.

A second enabling criteria may be satisfied when the metal temperature is greater than a predetermined metal temperature. The metal temperature may be provided by, for example, the metal temperature sensor 140 or the metal temperature module 226. The predetermined metal temperature may be calibratable and may be set to, for example, approximately 150° C.

A third enabling criteria may be satisfied when the engine speed is greater than a predetermined engine speed. The predetermined engine speed may be calibratable and may be set to, for example, approximately 4000 rpm. A fourth enabling criteria may be satisfied when the vehicle speed is greater than a predetermined vehicle speed. The vehicle speed may be determined based on one or more wheel speeds, a transmission input speed, a transmission output speed, and/or another suitable measure of vehicle speed. The predetermined vehicle speed may be calibratable and may be set to, for example, approximately 100 kilometers per hour (kph).

A fifth enabling criteria may be satisfied when the period of time that the switchable water pump 154 has been disengaged (i.e., off) since the engine startup is greater than a predetermined period. This period is referred to as a pump off period. A pump off timer 252 tracks the pump off period. The predetermined period may be calibratable and may be set to, for example, approximately 1000 seconds.

One or more modules or systems of the vehicle may request that the switchable water pump 154 be engaged. For example only, a thermostat diagnostic module 254 and an EGR cooling module 256 may request that the switchable water pump 154 be engaged. The thermostat diagnostic module 254 requests engagement of the switchable water pump 154 shortly after engine startup. The thermostat diagnostic module 254 requests that the switchable water pump 154 be engaged for performance of a diagnostic regarding whether the thermostat 155 is stuck in an open position. A sixth enabling criteria may be satisfied when the thermostat diagnostic module 254 requests that the switchable water pump 154 be engaged.

The EGR cooling module 256 also selectively requests that the switchable water pump 154 be engaged. The EGR cooling module 256 requests that the switchable water pump 154 be engaged for cooling of the exhaust gas provided to the engine 102 via the EGR valve 125. Engaging of the switchable water pump 154 circulates coolant to the EGR cooler 126. The coolant absorbs heat from the exhaust gas within the EGR cooler 126 and ensures that the exhaust gas is provided to engine 102 is at a lower temperature. Providing the exhaust gas at the lower temperature reduces the amount of nitrogen oxides (NOx) in the resulting exhaust gas. A seventh enabling criteria may be satisfied when the EGR cooling module 256 requests that the switchable water pump 154 be engaged.

Figure 3:
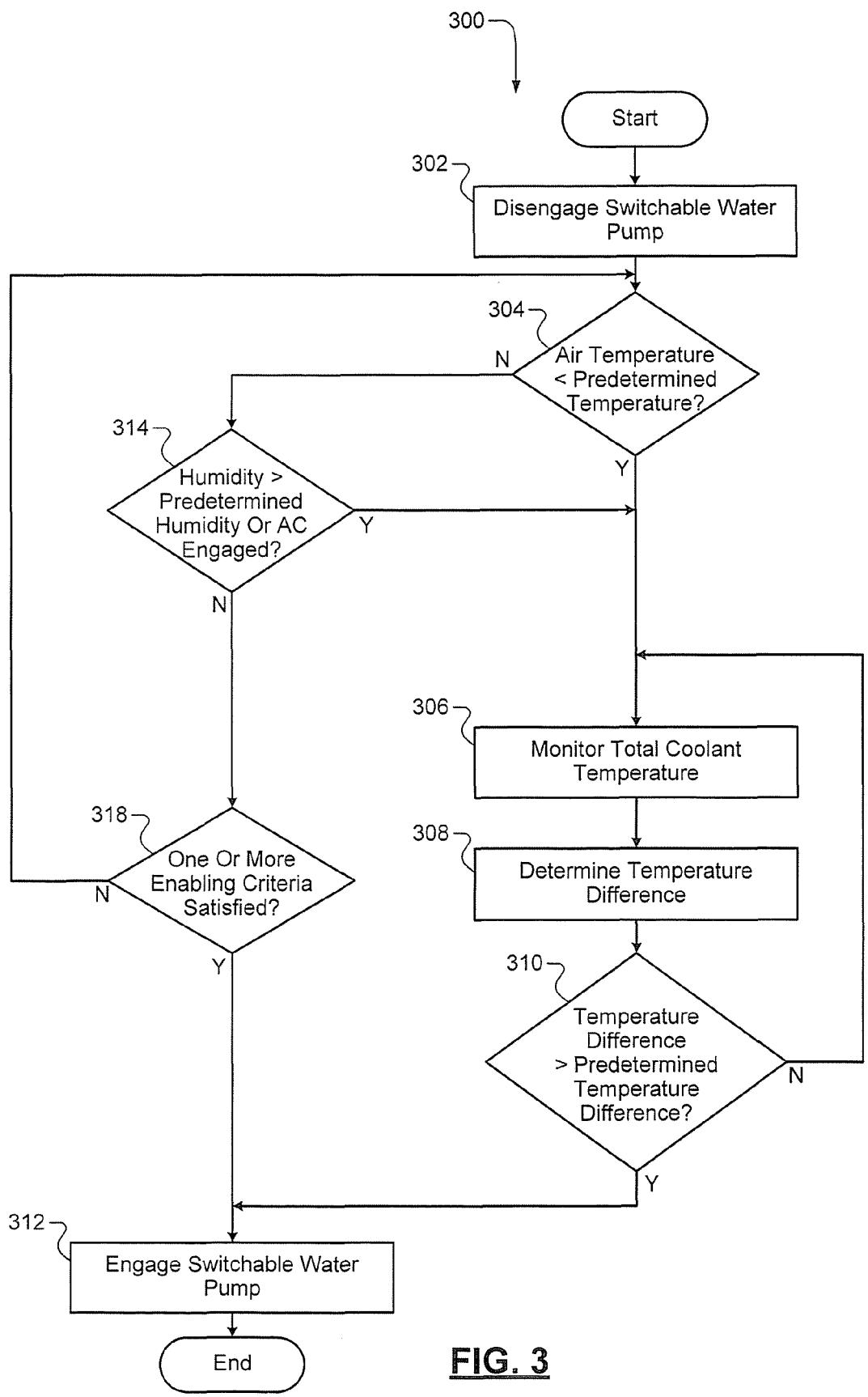
FIG. 3 is a flowchart depicting exemplary steps performed by a method according to the principles of the present disclosure.

Referring now to FIG. 3, a flowchart depicting an exemplary method 300 is presented. The method 300 begins upon startup of the engine 102, and the method 300 disengages the switchable water pump 154 in step 302. Disengaging the switchable water pump 154 after the engine 102 is started ensures that warm coolant is retained local to the engine 102, thereby increasing engine efficiency.

The method 300 determines whether the ambient air temperature is less than the predetermined temperature in step 304. If true, the method 300 determines that passenger cabin heating has likely been requested and continues to step 306. If false, the method 300 transfers to step 314, which is discussed further below.

In step 306, the method 300 monitors the total coolant temperature. The method 300 determines the temperature difference between the total coolant temperature and the ambient air temperature in step 308. The method 300 determines whether the temperature difference is greater than the predetermined temperature difference in step 310. If true, the method 300 engages the switchable water pump 154 in step 312, and the method 300 ends. If false, the method 300 returns to step 306.

In step 314 (i.e., when the ambient air temperature is not less than the predetermined temperature), the method 300 determines whether the humidity of the ambient air is greater than the predetermined humidity. The method 300 may additionally or alternatively determine whether the AC unit 164 is engaged in step 314. If true, the method 300 determines that passenger cabin heating has likely been requested and transfers to step 306. If false, the method 300 continues to step 318.

The method 300 determines whether one or more of the enabling criteria have been satisfied in step 318. If true, the method 300 engages the switchable water pump 154 in step 312 and ends. If false, the method 300 returns to step 304. For example only, the method 300 may engage the switchable water pump 154 when at least one of: (1) the engine load is greater than the predetermined engine load; (2) the metal temperature is greater than the predetermined metal temperature; (3) the engine speed is greater than the predetermined engine speed; (4) the vehicle speed is greater than the predetermined vehicle speed; (5) the pump off period is greater than the predetermined period; (6) the thermostat diagnostic module 254 requests that the switchable water pump 154 be engaged; and (7) the EGR cooling module 256 requests that the switchable water pump 154 be engaged. In this manner, the method 300 maintains the switchable water pump 154 as disengaged until one or more of the enabling criteria are satisfied when passenger cabin heating has not been requested.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system for a vehicle, comprising:
   a pump control module that disengages a switchable water pump from an engine upon startup of the engine;
   a heating request determination module that infers whether heating of a passenger cabin of the vehicle has likely been requested based on ambient air temperature, humidity of ambient air, and a status of an air conditioner clutch; and
   a climate control interface module that receives user input for cooling and heating of a passenger cabin of the vehicle, that controls a blower based on the user input, that is separate from the pump control module and the heating request determination module, and that does not transmit user input for heating of the passenger cabin to the pump control module or to the heating request determination module,
   wherein, when the heating request determination module infers that heating of the passenger cabin has likely been requested, the pump control module engages the switchable water pump in response to a determination that a difference between a coolant temperature and the ambient air temperature is greater than a predetermined temperature difference.

2. The engine control system of claim 1 wherein the heating request determination module infers that heating of the passenger cabin has likely been requested when the ambient air temperature is less than a predetermined temperature.

3. The engine control system of claim 1 wherein the heating request determination module infers that heating of the passenger cabin has likely been requested when the air conditioner clutch is engaged.

4. The engine control system of claim 1 wherein the pump control module engages the switchable water pump when at least one of an engine speed is greater than a predetermined engine speed, a vehicle speed is greater than a predetermined vehicle speed, and an engine load is greater than a predetermined engine load.

5. The engine control system of claim 1 wherein the pump control module engages the switchable water pump when a period that the switchable water pump has been disengaged after the startup is greater than a predetermined period.

6. The engine control system of claim 1 wherein the pump control module engages the switchable water pump when a metal temperature is greater than a predetermined temperature.

7. The engine control system of claim 1 further comprising a thermostat diagnostic module that selectively requests engagement of the switchable water pump after the startup and that selectively diagnoses faults in a thermostat while the switchable water pump is engaged,
   wherein the pump control module engages the switchable water pump when requested by the thermostat diagnostic module.

8. The engine control system of claim 1 further comprising an exhaust gas recirculation (EGR) cooling module that selectively requests engagement of the switchable water pump after the startup to cool exhaust gas provided to the engine,
   wherein the pump control module engages the switchable water pump when requested by the EGR cooling module.

9. The engine control system of claim 1 wherein the heating request determination module infers that heating of the passenger cabin has likely been requested when the ambient air temperature is greater than a predetermined temperature and the humidity is greater than a predetermined humidity.

10. An engine control method for a vehicle, comprising:
    using a pump control module, disengaging a switchable water pump from an engine upon startup of the engine;
    using a heating request determination module, inferring whether heating of a passenger cabin of the vehicle has likely been requested based on ambient air temperature, humidity of ambient air, and a status of an air conditioner clutch;
    using a climate control interface module that is separate from the pump control module and the heating request determination module:
       receiving user input for cooling and heating of a passenger cabin of the vehicle;
       controlling a blower based on the user input; and
       not transmitting user input for heating of the passenger cabin to the pump control module or to the heating request determination module; and
    when the result of the inferring is that heating of the passenger cabin has likely been requested, using the pump control module, engaging the switchable water pump in response to a determination that a difference between a coolant temperature and the ambient air temperature is greater than a predetermined temperature difference.

11. The engine control method of claim 10 further comprising inferring that heating of the passenger cabin has likely been requested when the ambient air temperature is less than a predetermined temperature.

12. The engine control method of claim 10 further comprising inferring that heating of the passenger cabin has likely been requested when the air conditioner clutch is engaged.

13. The engine control method of claim 10 further comprising engaging the switchable water pump when at least one of an engine speed is greater than a predetermined engine speed, a vehicle speed is greater than a predetermined vehicle speed, and an engine load is greater than a predetermined engine load.

14. The engine control method of claim 10 further comprising engaging the switchable water pump when a period that the switchable water pump has been disengaged after the startup is greater than a predetermined period.

15. The engine control method of claim 10 further comprising engaging the switchable water pump when a metal temperature is greater than a predetermined temperature.

16. The engine control method of claim 10 further comprising:
    selectively requesting engagement of the switchable water pump after the startup to cool exhaust gas provided to the engine; and
    engaging the switchable water pump when requested.

17. The engine control method of claim 10 further comprising:
    selectively requesting engagement of the switchable water pump after the startup to diagnose faults in a thermostat while the switchable water pump is engaged; and
    engaging the switchable water pump when requested.

18. The engine control method of claim 10 further comprising inferring that heating of the passenger cabin has likely been requested when the ambient air temperature is greater than a predetermined temperature and the humidity is greater than a predetermined humidity.

* * * * *